(12) United States Patent
dos Reis et al.

(10) Patent No.: US 9,581,396 B2
(45) Date of Patent: Feb. 28, 2017

(54) STRENGTHENING EMBOSSMENT FOR MOUNTING

(75) Inventors: Marco Antonio dos Reis, São Bernardo do Campo SP (BR); Michael Hartmut Kiessig, São Bernardo do Campo SP (BR); Mark Melnykowycz, Wintherthur (CH); Marcos Antonio P. Sacramento, São Bernardo do Campo SP (BR)

(73) Assignee: Autoneum Management AG, Winterthur (CH)

( * ) Notice: Subject to any disclaimer, the term of this patent is extended or adjusted under 35 U.S.C. 154(b) by 493 days.

(21) Appl. No.: 14/128,690

(22) PCT Filed: Jun. 21, 2012

(86) PCT No.: PCT/EP2012/061956
§ 371 (c)(1),
(2), (4) Date: Dec. 23, 2013

(87) PCT Pub. No.: WO2012/175607
PCT Pub. Date: Dec. 27, 2012

(65) Prior Publication Data
US 2014/0124177 A1    May 8, 2014

(30) Foreign Application Priority Data

Jun. 24, 2011 (EP) .................................... 11171364

(51) Int. Cl.
*F28F 7/00* (2006.01)
*B60R 13/08* (2006.01)
*F16L 59/00* (2006.01)

(52) U.S. Cl.
CPC ................. *F28F 7/00* (2013.01); *B60R 13/08* (2013.01); *B60R 13/0876* (2013.01)

(58) Field of Classification Search
CPC .............. F16L 59/00; F28F 7/00; B60R 13/08
USPC .......................... 428/156, 167, 172, 187, 600
See application file for complete search history.

(56) References Cited

U.S. PATENT DOCUMENTS

| | | | |
|---|---|---|---|
| 4,348,442 A | 9/1982 | Figge | |
| 6,821,607 B2 | 11/2004 | Zwick et al. | |
| 6,966,402 B2 | 11/2005 | Matias et al. | |
| 2010/0233430 A1* | 9/2010 | Malinek | B60R 13/0815 428/138 |
| 2012/0034431 A1* | 2/2012 | Caprioli | F16L 59/026 428/195.1 |

FOREIGN PATENT DOCUMENTS

| | | |
|---|---|---|
| DE | 20 2006 019984 U1 | 7/2007 |
| EP | 0 439 046 A1 | 7/1991 |

(Continued)

OTHER PUBLICATIONS

International Search Report dated Sep. 6, 2012, issued by the European Patent Office in corresponding International Application No. PCT/EP2012/061956 (4 pages).

*Primary Examiner* — Humera Sheikh
*Assistant Examiner* — Lucas Wang
(74) *Attorney, Agent, or Firm* — Sheridan Ross P.C.

(57) ABSTRACT

Heatshield with at least one hole, characterized in that an embossment pattern is arranged around the hole, whereby the embossment pattern comprises of a plurality of protruding elongated elements extending or radiating essentially perpendicular to the perimeter of the hole.

16 Claims, 5 Drawing Sheets

(56) References Cited

FOREIGN PATENT DOCUMENTS

Figure 1:
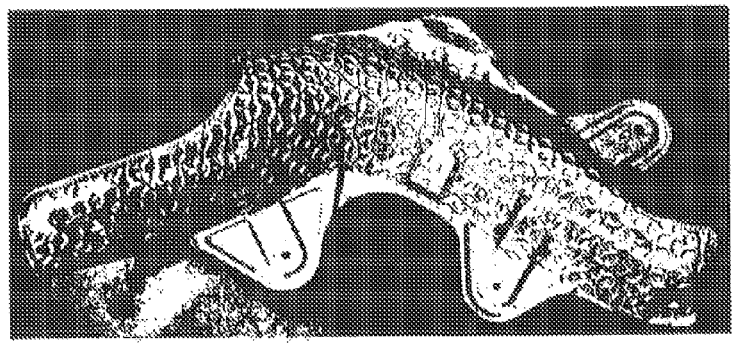

| | | |
|---|---|---|
| EP | 1 985 439 A1 | 10/2008 |
| EP | 2 070 771 A1 | 6/2009 |
| JP | 2004092543 | 3/2004 |
| WO | WO 2010/112354 A1 | 10/2010 |

* cited by examiner

STRENGTHENING EMBOSSMENT FOR MOUNTING

CROSS-REFERENCE TO RELATED APPLICATIONS

This is a U.S. National Phase Application of International Application No. PCT/EP2012/061956, filed Jun. 21, 2012, which claims the benefit of priority to European Patent Application No, 11171364.0, filed Jun. 24, 2011, which are incorporated herein by reference.

TECHNICAL FIELD

The present invention relates to optimising the fatigue properties of structural holes in thermal protective shielding parts for automotive applications, in particularly the mounting area of metal heat shields, for instance in the engine bay area, the underbody area or along parts of the power train.

BACKGROUND ART

Heat shields are used in various forms for sound and heat insulation while taking into account a wide range of installation and operating conditions for instance in the engine bay area or underneath the car along the exhaust line. Above all they are used for protection of temperature sensitive components and systems in order to prevent overheating, e.g. due to heat radiated and generated by the engine and/or the exhaust system.

For such heat shields a wide range of constructions is known, e.g. single-layer or multilayer formed bodies that can be manufactured from different materials. Due to the high thermal load the main materials used today are mainly metal based, for instance steel, aluminium or alloys.

Heat shields are classically made from metal sheet material, mainly steel, alloys, or aluminium, the material being used for the supporting sheet, cover sheet and also for the insulation function. In many cases the main area of the heat shield is embossed to increase the apparent stiffness of the part. The embossing of the sheet metal material can be done using rollers in a continuous process, with a plate press process or with a stamp and die method. To increase the effectiveness of the heat shield and to reduce the space required for the shield, the metal sheet or stack of sheets may be contoured to closely resemble the shape of the outer surface of for instance the exhaust manifold.

Most of the known 3D structure patterns used today as embossments are made of a repeated single form or topographical element such as a ridge or knob. U.S. Pat. No. 6,966,402 discloses a pattern with a plurality of dimples formed in a geometric shape selected from a group consisting of a spherical shape, a pyramidal shape, a conical shape or a trapezoidal shape and where the dimples are distributed in an offset of, or uniform rows and columns or in a randomised pattern. EP 0439046 A discloses a 3D pattern in the form of a diamond shaped cross-hatching pattern, which allows the sheet to be stretched and compressed as needed. Also the use of wrinkling or dimpling is disclosed, for instance a plurality of creases or ridges such as in the shape of corrugations. U.S. Pat. No. 6,821,607 discloses the use of knobs having a draped or folded type structure, which increases the compression resistance for the individual knobs and therefore increases the bending strength of the entire sheet material. WO 2010/112354 shows an example of such an optimised embossment having a plurality of indentations or embossments, whereby all the embossments are protruding towards the same direction normal to the surface of the plain sheet material, defined as the neutral plane n, essentially by the same distance h away from this neutral plane, and whereby the plurality of embossments together form a regular network, whereby essentially each embossment intersects with at least two other embossments to form a junction.

To mount the heat shield around the heat source, generally standard means for fastening are used such as bolt and nuts, or clipping, normally combined with washers or shims. By using these types of fastening methods the heat shield is rigidly fastened to the vehicle. During use of the heat shield—when the vehicle engine is running and/or the vehicle is rolling—the heat shield can vibrate in a frequency dependent manner, for instance related to the speed of the motor, the road surface the vehicle is driving on, the mechanical response of the vehicle suspension system, etc. These vibrations can induce mechanical loads in the fastening area including large bending moments in the material near the connection fastening area. Over the lifetime of the vehicle, these repeated vibrations, at different amplitudes and frequencies, can induce crack development and growth in the heat shield material, eventually leading to large cracks or material failure in the connection areas, this process is termed the fatigue life or durability of the heat shield.

Fatigue loading is the process or phenomenon of repeated cyclic loadings induced on a material or structure, inducing stresses or strains, which are below the quasi-static failure limits of the material. In sheet metal structures such as heat shields, fatigue induced cracks will generally start on the surface of the material, and then propagate along the part surface and also through the thickness of the sheet material. Crack development and propagation are driven by the stress fields existing due to deformation of the material due to vibration loading. Initial surface cracks are difficult to detect visually, but will lead to reduction in stiffness of the material, and a reduction in vibration response of the heat shield. Failure can be influenced by a number of factors including size, shape and design of the component or the condition of the surface or operating environment.

Therefore connections must take into account the tightness and stability required for each heat shield and also the oscillations affecting the location of the installation, in order to prevent damage to the heat shield and/or the undesired detachment of fasteners.

In praxis the area around such structural holes for mounting of the heat shield, but also for passing through and connecting of sensors or cables, embossing is normally absent or eliminated to obtain a flat area to enhance the contact between the means for fastening and the heat shield, thereby enhancing the overall fastening function. Generally, the connection area will be embossed similar to the rest of the heat shield, but during part forming the connection area will be compressed by flat parallel plates and flattened, compressing the embossed topography to nearly or totally flat. Through the use of materials and the construction of the heat shields, the tightening torque of the screws cannot be set excessively high in order to prevent damage to the heat shield.

The cost effective simple solutions, that use screws with disk rings or spring rings (also known as shims or washers), are also limited because they merely allow a reduction of the surface pressure under the bolt area, but do not influence the transition area from the washer to the connection area, which is often a point of crack nucleation and propagation due to bending induced by vibration loading. Also the use of several unconnected individual parts to attach the heat shields naturally increases the assembly effort and production cost.

In automotive production there is a significant demand for lightweight construction using metal sheet components. The use of thinner sheets is essential in achieving weight reduction of heat shields. However by reducing the thickness of the part, the rigidity of the part decreases and susceptibility to vibration-induced stresses will increase the risk of fatigue failure. Susceptibility to fatigue cracks will be most critical in areas where the material is bent, over high-aspect ratio geometries, or where through holes are formed for mounting the heat shield in place.

SUMMARY OF INVENTION it is the objective of the invention to increase the durability of heat shields in the area of structural through holes, in particular in the mounting area, such that cost effective and simple fasteners can still be used and at the same time the thickness of the metal for the heat shields can be reduced in weight, maintaining the same overall durability in vibration and thermal testing.

This objective is realised according to the invention with a thermal shield made of a sheet of metal with at least one mounting hole that has the features of claim 1—an embossment pattern comprising of a plurality of protruding elongated elements extending or radiating essentially perpendicular to the perimeter of the hole. In particular by having the strengthening embossment in the pattern as set out in the claim, it is possible to increase the stability of the mounting area and at the same time to reduce crack nucleation and propagation around the mounting area for a longer lifetime of use. It was found that not only are crack nucleation and propagation reduced, but also that the likelihood of the occurrence of undesired detachment decreased.

The embossment around the hole according to the invention comprises a pattern of elongated protrusions, which increase the bending and torsional rigidity of the mounting area. This increased stiffness of the mounting area reduces bending at the interface to the fastening means, for instance the washer or shim (where crack generally propagates from). The embossed pattern covered by the fastening means after mounting of the heat shield in its place of use, can be compressed by the fastening means using a predefined torque or stamping tool, resulting in plasticized area underneath the fastening means with increased crack propagation resistance.

The strengthening embossment is formed around structural holes, in particular for mounting the heat shield, or for pass-through and eventually mounting of sensors, cables or other appliances. The hole may be round or an alternative shape to fit the function needed. The embossment according to the invention may be optimised to balance the local differences in stress load. The chosen elongated shape for the elements influences the crack growth by interrupting the natural stress lines of the part.

The strengthening embossment around at least one such hole in a metal sheet comprises a plurality of radiating elements protruding out of at least one side of the plane of the sheet material, having an elongated shape with a length l, and a width w, and a maximum height of protrusion h. The elongating protruding elements radiate or extend from the perimeter of the material around the hole, with the centre of the hole as the central point of the circular array of protrusions. In case the hole is an alternative shape the extension will be essentially perpendicular to the perimeter of the hole, keeping the alternative shape as reference. For instance in case the hole is oval the protrusions will radiate more in an oval pattern rather than in a round pattern.

Extending essentially perpendicular can also be defined as an extending essentially normal to the tangent of the perimeter of the hole. Preferably the elongated elements are extending perpendicularly, at an angle of 90° to the perimeter of the rim, however also offset of between approximately −45° and +45° of the perpendicular angle is possible and depends on the actual form of the individual protrusions.

Preferably the back surface of the embossment contains the reverse pattern of protrusions. This is in particular visible if using a punch and die method. As the means for mounting may be located at both sides of the through hole, it is advantageous that the embossing pattern is evenly balanced in protrusions on both sides of the sheet material. In particular to obtain a consistent flattening on both sides of the material for instance upon fastening the mounting using a defined torque.

Preferably the elements in the elongated direction are straight, curved, in a swirl, S-form or cornered S form or a combination of these forms. To enhance the fastening and the contact between the sheet material and the mounting appliances, preferably the elements have an increasing thickness either in the direction of the centre of the hole or in the direction away from it. In addition the elements may have an increasing height either in the direction of the centre of the hole or away from it. The actual shape of the protruding elements is dependent on the vibration load in the area of interest.

The radiating elongated elements preferably start directly at the rim of the sheet material at the through hole. The elements may be close to touching the neighbouring elements directly around the hole. The ridge of the element may be rounded, or sharp edged, the protrusion thereby forming an arc shape.

Preferably at least between 5 and 10 elements, preferably 6-8 elements are located around at least one hole. The elements are arranged in a circular array around the centre of the hole such that they are evenly spread along the perimeter of the hole. Preferably the distribution of the elongating elements extend in an apparent circular array in a pattern in a symmetric pattern around the hole, to obtain a similar stiffness in all directions parallel to the original plane of the sheet material, in the direction of the hole centre. However the length of the single elements forming a strengthening embossment around a hole may be different, for instance to compensate for an unbalanced load division around the hole.

Heatshield with means for fastening the heatshield to the place of use, comprising at least one hole for mounting the heatshield using the means for fastening whereby preferably the diameter of the embossment array is at least 2-times the diameter of the means for the fastening. Therefore the rim of the washer, shim or nut used for the fastening ends in the embossment area according to the invention. Furthermore the torque used to fasten the mounting means may be enough to flatten the area covered by the mounting means thereby increasing the contact area, hence the fastening and at the same time decreasing the possibility of crack nucleation and propagation.

Alternatively the embossing pattern is at least partly flattened again to increase the possible contact area with the means for fastening and ease the mounting of the heat shield in its place of use. At least partly the area to be covered by the means for fastening may be flattened or de-embossed again before mounting the heat shield.

These and other characteristics of the invention will be clear from the following description of preferential forms, given as non-restrictive example with reference to the attached drawings. The drawings are only schematic and not in scale.

FIG. 1 Typical example of a heat shield with mounting holes

Figure 2:
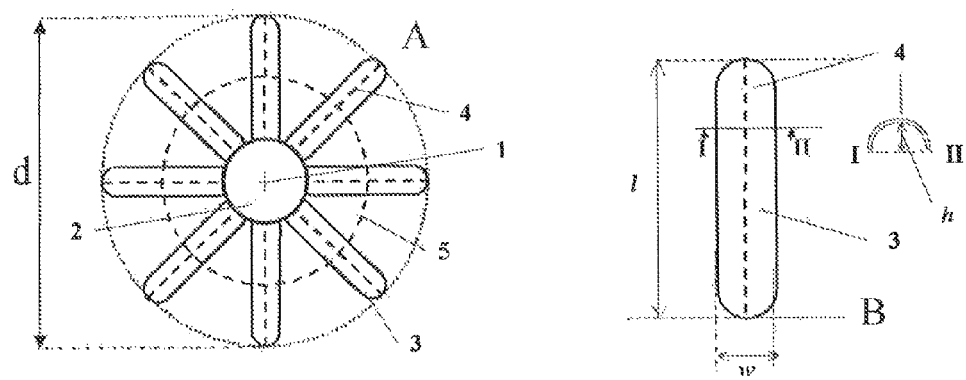
Figure 2:
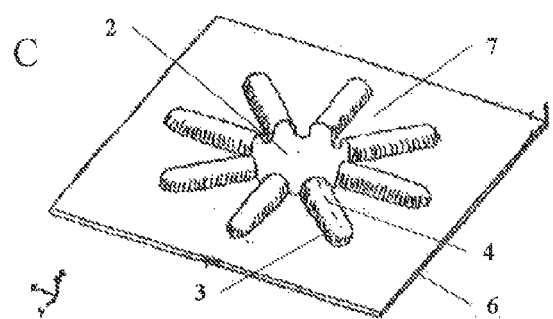

FIG. 2A An embossment according to the invention view from the top

FIG. 2B Dimension of the embossment element of FIG. 2A

FIG. 2C 3D picture of the embossment of FIG. 2A

FIG. 3A Alternative embossment according to the invention top view

FIG. 3B Dimension of the embossment element of FIG. 3A

FIG. 3C 3D picture of the embossment of FIG. 3A

FIG. 4A Alternative embossment according to the invention top view

FIG. 4B the single embossment element of FIG. 4A

FIG. 5A Alternative embossment according to the invention top view

Figure 5:
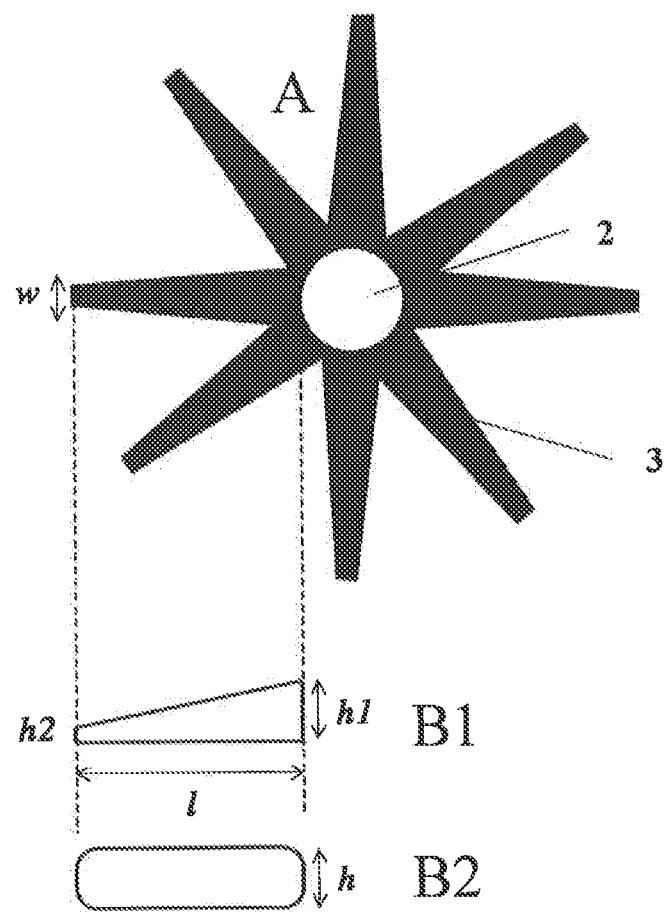
Figure 6:
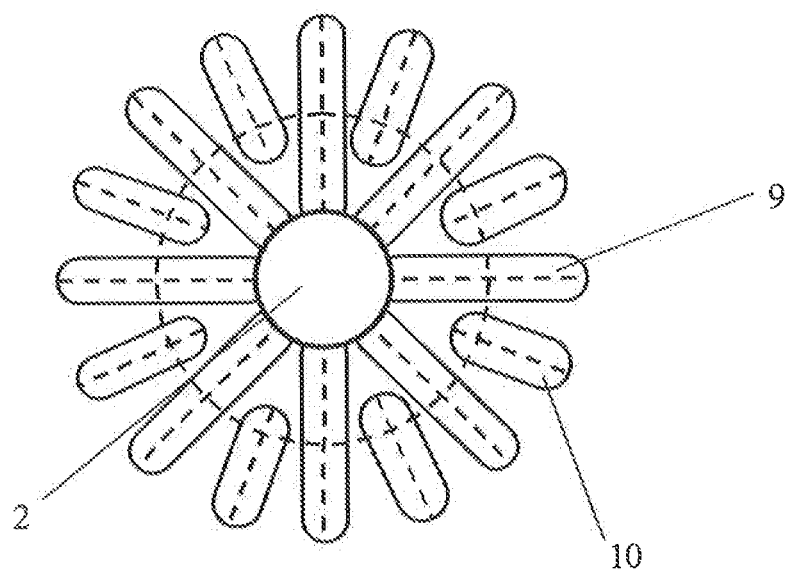
Figure 7:
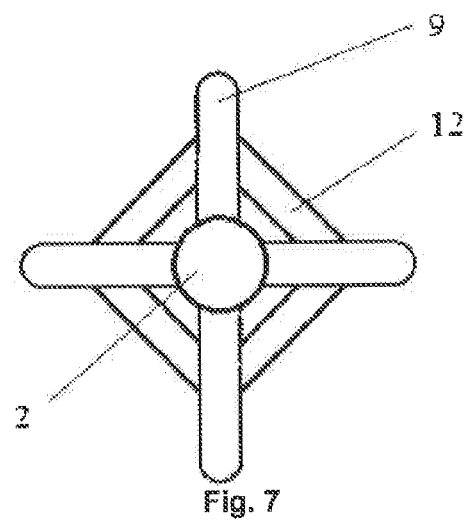
Figure 8:
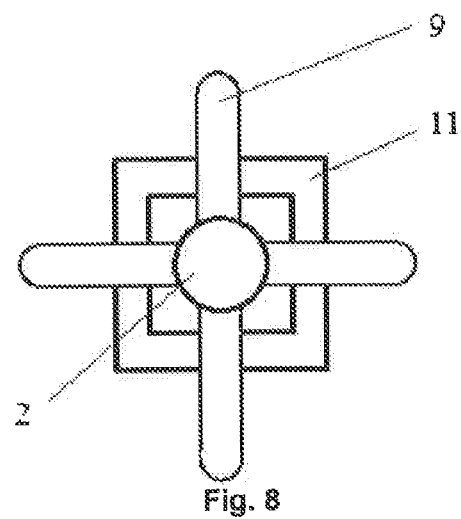

FIG. 5B1 and B2 are alternative solution for the cross section of the individual elements of the embossment FIGS. 6, 7 and 8 Alternative embossment patterns according to the invention.

FIG. 1 shows an example of a heat shield with hole for mounting according to the state of the art. The mounting area is located on separate flat areas without embossment.

FIG. 2A-B show the simplest form of an embossment according to the invention, with rod like elements (3), which extend radially around a round hole (2) with a centre (1). The overall diameter (d) is larger than the area (5) emphasised to be covered by the means for fastening, for instance by a shim or washer, or directly by the bold or nut. Preferably the area of coverage is at least half of the total area of embossment around the hole. With dashed line (4) the ridges of the elements are given. At the ridge the height (h) of the embossment is maximal. This is also pictured in FIG. 2B in particularly in cross section I-II. The elements have a length (l) and a width (w). FIG. 2C shows a 3D picture of a sheet of material (6), preferably a metal, like steel, aluminium or other suitable metal alloy, with a hole and an example of an embossment according to the invention around this hole (2), with a plurality of single elements (3) with a ridge (4). The area between the embossed elements (7) would form an inverse pattern, preferably also protruding at the opposite surface of the sheet.

Figure 3:
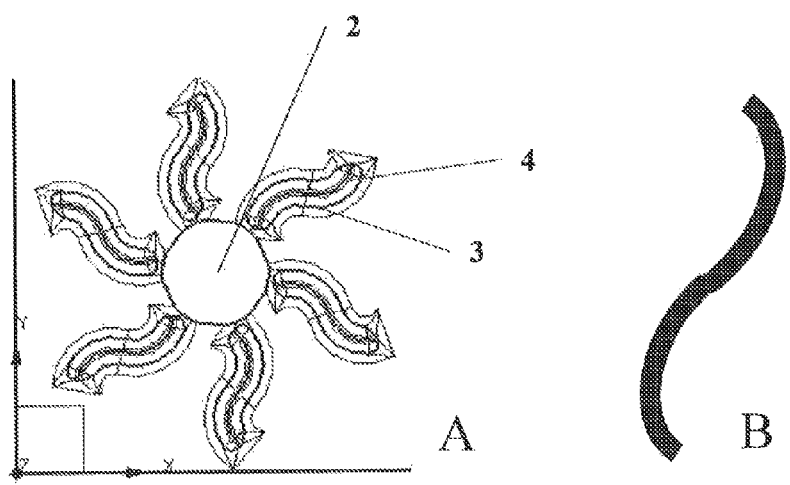
Figure 3:
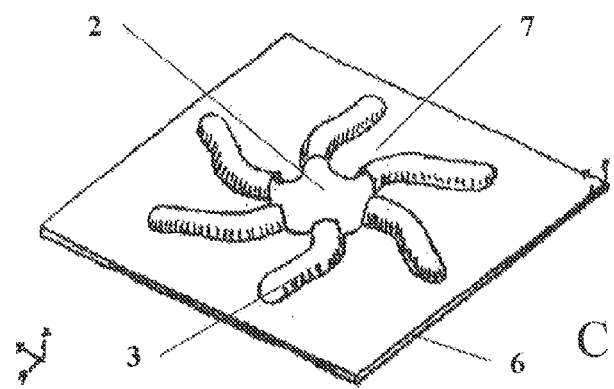

FIG. 3 A-C show an alternative embossment, with plurality of elements in a curved, S shape elongated form. The description of the reference numbers is kept consistent with FIG. 2 A-C.

Figure 4:
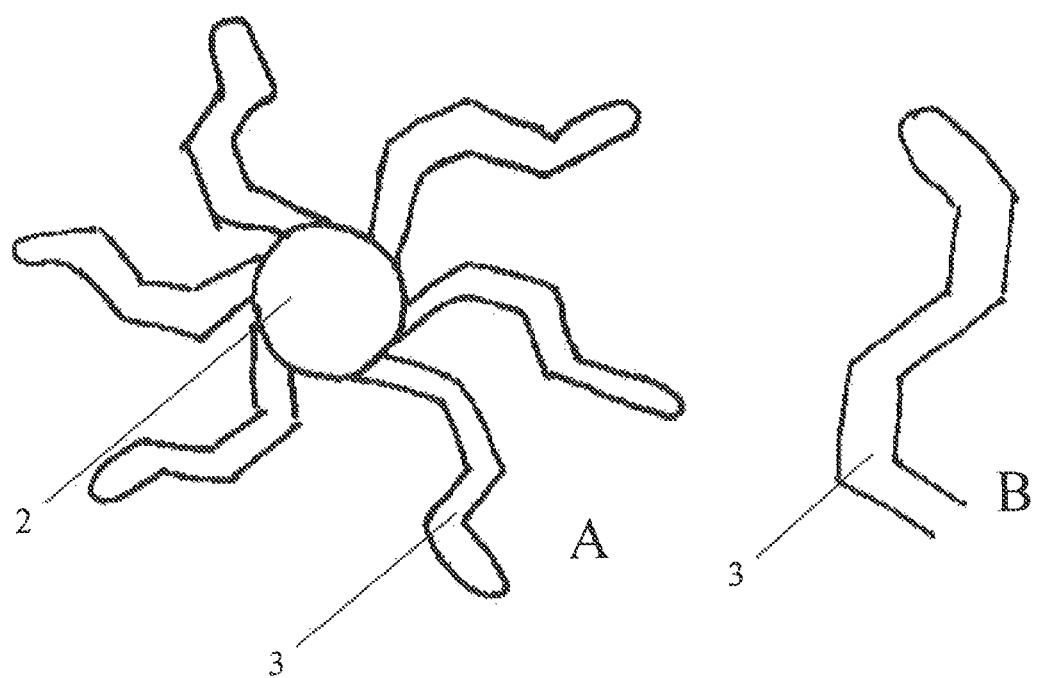

FIG. 4 A-B shows an alternative embossment with a cornered elongated shape. This is an example where the embossed element is in an angle to the tangent of the perimeter of the hole.

FIG. 5 A-B shows another alternative embossment with a plurality of protruding elements in a tapered elongated form. In FIGS. 5 B1 and B2 alternative cross sections through the length of the elements are given. In B1 the elements are decreasing in height from h1 to h2 over the length of the element while in B2 the height stays essentially constant. These variances in height can also be used in alternative element shapes for instance according to FIG. 2, 3 or 4.

Independent from the embossment around structural holes the main area of the heat shield may be embossed with a similar or different pattern to enhance the overall stiffness and durability of the heat shield. It might for instance be used with a heat shield without an embossment or with an embossment as disclosed in WO 2010/112354. The embossment can be applied on a single layer of material or directly on multiple layers of materials stacked together.

In an alternative solution according to FIG. 6 between the primary elements (9) of the embossments according to the invention for instance according to FIG. 1A, secondary elongating protruding elements (10) are arranged in between the primary elements. These elements are also extending perpendicular to the perimeter of the hole. However they do not start directly at the rim of the material but slightly before the end of the coverage of the fastening element. A small length of the element will be covered by the fastening element for instance the washer or the shim, thereby further improving the stiffness of the area directly surrounding the fastening means.

Figure 9:
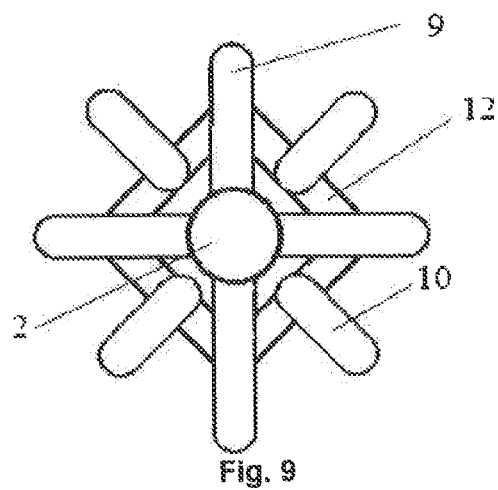

In yet another alternative solution according to FIG. 7 to 9, additional tertiary elongating protruding elements (11) are arranged between the primary (9) and/or the secondary perpendicular protruding elements (10). However these elements are not extending perpendicular to the perimeter of the hole, instead they are directed to the adjacent primary or secondary elements and connect these. Either one element (12) is connecting two perpendicular primary elements (FIG. 7).

Or preferably two such tertiary elements are arranged between the two perpendicular primary elements and are connecting these, whereby the two perpendicular tertiary elements form an elbow with an angle of around 55° to 35° preferably around 45° with the inner site of the bend (12) pointing towards the centre of the structural mounting hole (2) (FIG. 8).

The use of all three protruding elements can be used in whatever combination depending on the local load requirements on the structural hole or connection, as well as on the connecting material used and size and shape of possible shims, rings and or bolds. The figures show only examples of possible combinations and the main groups of protrusions they are not exhaustive in the number of combinations, these can be more than is currently shown. The pattern might be asymmetric or symmetric also dependent on the actual requirements at use.

FIG. 9 shows a combination of all elements according to the invention:
  Primary perpendicular protruding elements (9)
  Secondary perpendicular protruding elements (10) and
  Tertiary perpendicular protruding connecting elements (12)

By using such local strengthening embossments to counter local stress loads it is possible to use less material on the main area of the product therefore saving weight and reducing material cost. Also the long-levity of the part can be enhanced. By combining all three groups of elements the shim, washer or nut used can be stabilised during fastening and in use.

The invention claimed is:

1. A heatshield, comprising: at least one structural hole extending entirely through the heatshield; and an embossment pattern arranged around the hole, the embossment pattern comprising a plurality of protruding elongated elements that extend or radiate from a perimeter of the hole.

2. The heatshield according to claim 1, wherein each of the protruding elongated elements extend or radiate from the perimeter at an angle that is between −45 to +45 degrees from a line extending perpendicular to a tangent of the hole at the perimeter.

3. The heatshield according to claim 1, wherein the protruding elongated elements in the extending direction are formed in at least one shape selected from the group consisting of: a straight shape, a curved shape, an S-shape, and a cornered elongated shape.

4. The heatshield according to claim 1, whereby the embossment pattern is symmetrically aligned around the hole.

5. The heatshield according to claim 1, wherein the length of the individual protruding elongated elements is optimized to balance the local differences in stress load.

6. The heatshield according to claim 1, whereby the protruding elongated elements are starting at the perimeter of the hole.

7. The heatshield according to claim 6, whereby the embossment pattern comprises additional protruding elongated elements extending perpendicular or radially to the perimeter of the hole, and whereby these additional elements are located between the other elements and start with a distance from the perimeter.

8. The heatshield according to claim 1, whereby the embossment pattern comprises additional protruding elongated elements and whereby at least one additional element is located between the other elements and connecting the adjacent other elements.

9. The heatshield according to claim 1, whereby the heatshield is either made of a single layer metal, or a stack of layers whereby at least one outer layer is formed of metal.

10. The heatshield according to claim 9, wherein the metal is selected from the group consisting of: aluminum, an aluminum alloy, steel, and stainless steel.

11. The heatshield according to claim 1, additionally comprising means for fastening the heatshield to a vehicle or means for fastening appliances to the heatshield, such that the means for fastening covers at least half of a total area of the embossment pattern around the hole.

12. The heatshield according to claim 11, wherein the means for fastening covers less than 95% of the total area of the embossment pattern around the hole.

13. The heatshield according to claim 12, whereby the embossment pattern comprises additional protruding elongated elements extending perpendicular or radially to the perimeter of the hole, the additional elements being located between the other elements and starting with a distance from the perimeter, and the additional protruding elements are at least partly covered by the means for fastening.

14. The heatshield according to claim 11, whereby the means for fastening are fastened with a predetermined torque to flatten the area of the embossment covered thereby.

15. The heatshield according to claim 11, wherein the area of the embossment pattern around the hole is at least partially flattened back to an essentially flat area.

16. The heatshield according to claim 2, wherein at least one of the protruding elongated elements extends from the hole essentially perpendicular to the tangent.

\* \* \* \* \*